United States Patent [19]
Anderson

[11] Patent Number: 5,401,156
[45] Date of Patent: Mar. 28, 1995

[54] MACHINE FOR INSERTING A SIZED PORTION OF A FOOD PRODUCT INTO A CONTAINER

[75] Inventor: Paul S. Anderson, Astoria, Oreg.

[73] Assignee: Carruthers Equipment Co., Warrenton, Oreg.

[21] Appl. No.: 164,138

[22] Filed: Dec. 8, 1993

[51] Int. Cl.⁶ .................. B29C 43/14; B30B 7/04; B65B 63/02
[52] U.S. Cl. ................... 425/147; 53/529; 141/81; 425/149; 425/292; 425/412; 425/415
[58] Field of Search ............... 425/145, 147, 149, 292, 425/308, 344, 345, 352, 353, 412, 415, 422; 53/122, 529; 141/71, 73, 81, 146, 153

[56] References Cited

U.S. PATENT DOCUMENTS

| | | | |
|---|---|---|---|
| 3,026,660 | 3/1962 | Luthi et al. | 53/529 |
| 3,179,041 | 4/1965 | Luthi et al. | 425/145 |
| 3,186,140 | 6/1965 | Bogdanovich | 53/529 |
| 3,476,037 | 11/1969 | Gorby | 425/345 |
| 3,501,890 | 3/1970 | Hunt | 53/529 |
| 3,734,663 | 5/1973 | Holm | 425/149 |
| 4,680,158 | 7/1987 | Hinzpeter et al. | 425/149 |
| 4,966,538 | 10/1990 | Linke et al. | 425/149 |
| 5,041,297 | 8/1991 | Dowaliby | 425/192 R |
| 5,046,304 | 9/1991 | Alameda et al. | 53/529 |
| 5,211,964 | 5/1993 | Prytherch et al. | 425/149 |

Primary Examiner—James P. Mackey
Attorney, Agent, or Firm—Robert L. Harrington

[57] ABSTRACT

An automatic filling machine for forming, sizing, transferring and inserting a food product portion into a container. The machine has forming chambers that are expandable to facilitate receiving a food product in bulk and are contractible to define a column having a cross section mating that of a container to be filled. The chamber is expanded to receive a quantity of a food product that is to be inserted into a container. The chamber is contracted to form the food product received therein into a column as defined by the contracted chamber. An upper plunger is provided to force and compress the formed food product column into a sizing apparatus. A pressure switch controls the compressive force applied to the food product column to provide consistency between sized portions of the food product. The machine is operable under single cycle or continuous cycle mode and is arranged to insert a single sized portion into a container, to insert multiple portions into a container and to insert portions of different food products into a single container. The operation of machine is controlled by a programmable controller.

5 Claims, 5 Drawing Sheets

MACHINE FOR INSERTING A SIZED PORTION OF A FOOD PRODUCT INTO A CONTAINER

FIELD OF THE INVENTION

This invention relates to filling machines for food products and more particularly relates to a food product filling machine having improved food product portion sizing.

BACKGROUND OF THE INVENTION

Canning apparatus has been developed to insert food products such as meat, vegetables and the like into containers. The food product is most often cut or sliced into smaller pieces such as cubes prior to the insertion of the food product into the container. One of the benefits of the cube like pieces is that it is easier to produce a uniformly sized portion to be inserted into the container. The sized portion may relate to the volume or the weight of the food product.

Typically the canning or filling apparatus has a basin which receives the cubed pieces in bulk. The basin has depending sleeves that have a cross section that match the cross section of the container in which the food product is to be inserted. Mounted above the depending sleeves are upper plungers. The plungers are movable downward to force and compress the food product into the depending sleeves. Generally there are movable inserts that are movable between alignment with the depending sleeves and the containers to be filled. The inserts are open ended and receive a lower plunger when in alignment with the depending sleeves. The lower plunger is in opposition to the upper plunger and thus the food product is compressed in the depending sleeve and the insert by the counter action of the upper and lower plungers. The upper plungers are urged downward such as by cam action in conjunction with biasing springs to provide a yieldable compressive force. When the food product is compressed, a knife enters between the depending sleeve and the insert to sever the desired portion that has been forced into the insert. The insert is then moved into alignment with the container and a tamper ejects the food product from the insert into the container. A typical machine as generally described above is disclosed in U.S. Pat. No. 5,041,297, which is incorporated in full herein by reference.

The basin which receives the food product in bulk has baffles or other apparatus to aid in directing the food into the depending sleeves. Even with this arrangement, a portion of the food product will be above and surround the top opening to the sleeves. As the upper plunger descends, cubes of the food product are often caught between the edges of the upper plunger and the sleeve. This results in the tearing or shredding of the food product which is undesirable. Also, depending on the food product being processed, a cube caught between the upper plunger and the sleeve edge will cause a jamming or a partial jamming of the upper plunger. Also, every different product has a different coefficient of friction which changes the amount of force necessary to push the product down through the sleeve. Each of these conditions affects the compressive force applied by the upper plunger to the food product received in the sleeves and inserts. The variance in the compressive force affects the compaction of the food product in the sleeve and insert which will cause a variance in the density of the food product and thus cause a variance in the weight for a given volume of the food product portion.

The upper plungers, as previously mentioned, are yieldably biased downward, such as by cam action in conjunction with a biasing spring to force the upper plungers downward. The cam action in conjunction with the spring thus only controls the force that the upper plunger will exert in the downward direction at the top of the column of product and does not control the actual compressive force applied to the food product being sized in the insert.

BRIEF SUMMARY OF THE INVENTION

The preferred embodiment of the present invention is a filling machine for placing a determined portion of a food product into a container. The filling machine has a receiving chamber that is expandable to facilitate receiving, directly from a conveyor, a quantity of a food product. The chamber is contractible to compressively form the food product received therein into a column having a cross section mating that of a container into which a determined portion of the food product will be inserted. The formed column of food product is then forced by a plunger into a portion sizing insert. A pressure switch at the bottom of the insert determines the pressure applied to the food product being compressed into the insert to determine the proper compression of the product in the insert. The stroke of the plunger is monitored and determines the amount of replenishing food product to be delivered to the receiving chamber. Coordination of all of the operations is controlled by a programmable controller.

The present invention thus eliminates the basin and the problem of tearing and shredding of the food products, and provides a more consistent fill of the containers.

Refer now to the drawings and the detailed description for a complete understanding of the filling machine of the present invention.

DESCRIPTION OF THE PREFERRED EMBODIMENT

Figure 1:
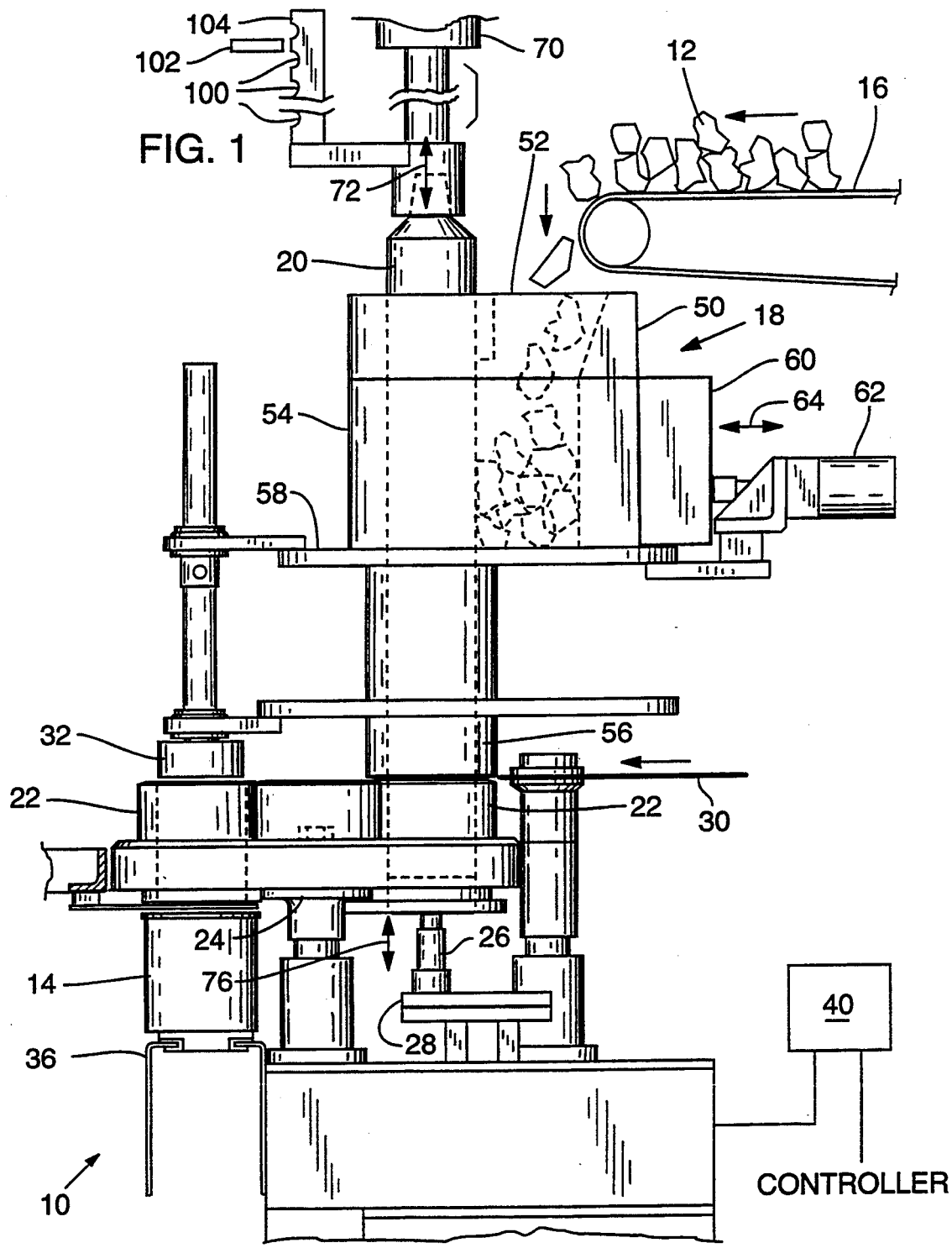
FIG. 1 is a view of the filling machine of the present invention.

Refer to FIG. 1 of the drawings which illustrates a preferred embodiment of a food product filling machine 10. Only the components necessary for an understanding of the present invention are shown. The machine 10 under the control of a programmable control 40 is operable to insert a single sized portion of a determined quantity of food product into a container, is operable to insert multiple sized portions of a determined quantity of a food product into a container and is operable to insert sized portions of a determined quantity of two different food products into a container. In this embodiment, the machine 10 has two stations for sizing a portion of a food product. The sized portions of a determined quantity are transferred to a container filling station by an indexable turret where the sized portions are inserted into containers.

One feature of the machine 10 is the unique manner in which the sized portion of the food product is formed. The machine 10 has forming chambers 18 which are arranged to expand to receive a quantity of the food product 12 from a bulk conveyor 16 and which contract to form the food product into a formed column having the desired cross section mating that of a container 14 to be filled.

Basically a determined portion of food product 12 that is to be inserted into a container 14 is conveyed on a conveyor 16 to simultaneously fill the expanded forming chambers 18. The forming chambers 18 are then contracted to form the food product 12 into a defined column. The forming chambers 18 are further described and illustrated later. An upper plunger 20 compresses and forces the defined column of the food product 12 downward into a turret insert 22. The turret insert 22 is open ended and is mounted in an indexable turret 24. The height of the portion of the food product 12 formed in the turret insert 22 is controlled by a lower, upwardly directed, plunger 26. The lower plunger 26 is movable upward into the turret insert 22 to a desired position to thus establish the height of the food product 12 to be formed in the insert 22.

An upper plunger 20 forces and compresses the food product 12 into the insert 22 and against the lower plunger 26. A pressure switch 28 controls the amount of compressive force on the column of the food product 12. A knife 30 which travels between the upper end of the turret insert 22 and the lower end of a column insert 56 severs the portion of the food product received in the turret insert 22 from the balance of the formed food product column. The insert 22 and the lower plunger 26 in combination cooperatively define a portion sizing apparatus. The cross section of the insert 22 defines the cross section of the portion to be sized and the distance the lower plunger 26 is inserted into the insert 22 determines the height of the portion to be sized. The lower plunger is retracted out of the turret insert 22 and the turret 24 is indexed to transfer the turret insert 22 and the food product portion contained therein to the container filling station.

The turret 24 is in effect a transfer mechanism to transfer the insert 22 and the sized portion of the food product 12 from the sizing station to the container filling station. A tamper 32 is provided to eject the food product 12 formed in the insert 22 into a container 14. The container 14 is transported on a conveyor 36 under the control of the controller 40 in conjunction with the operating cycle of the machine 10. The above briefly describes the general operation of one station of the machine 10.

Figure 2:
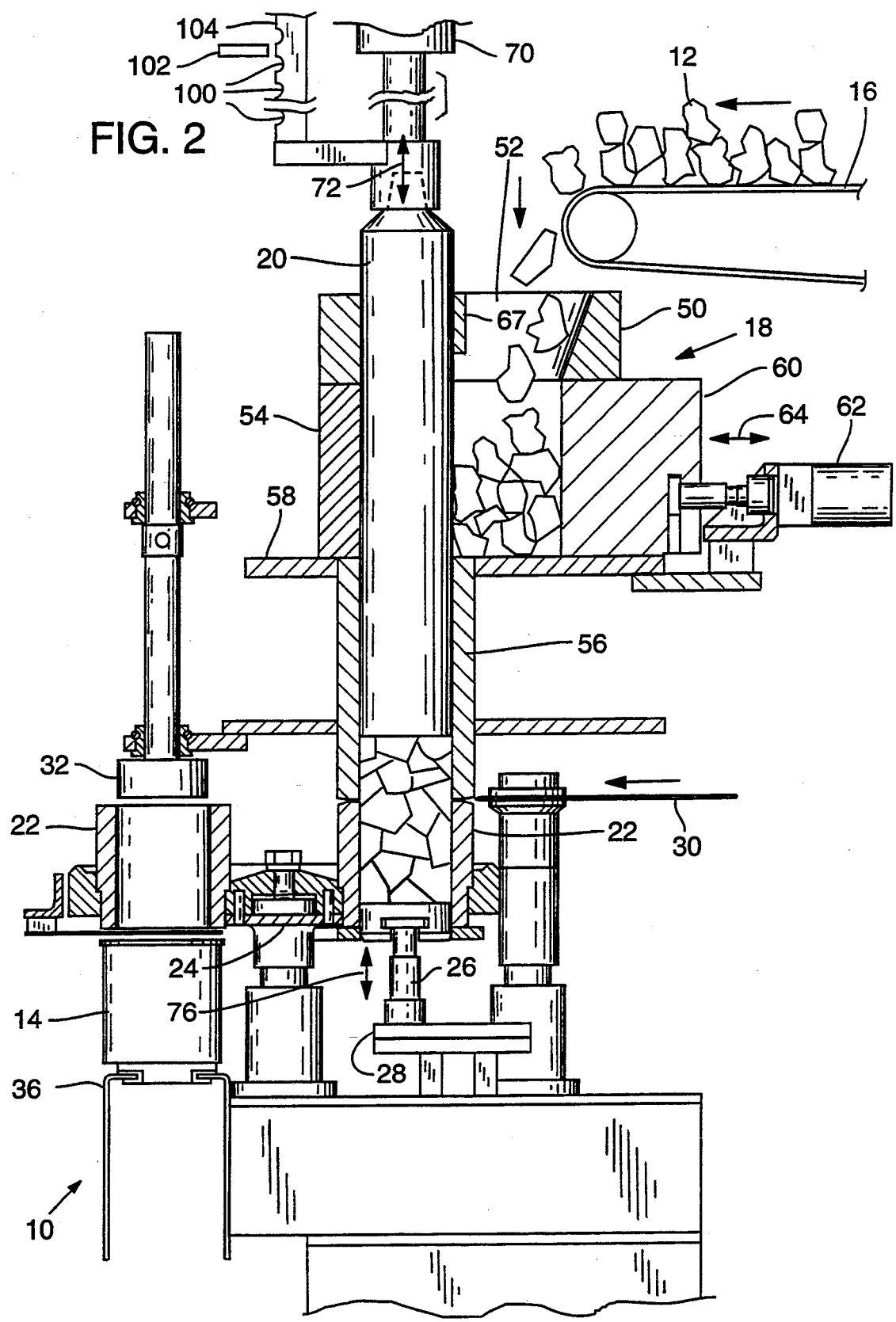
FIG. 2 is a sectional view of the filling machine of the present invention showing the forming chamber in the expanded condition.
Figure 4:
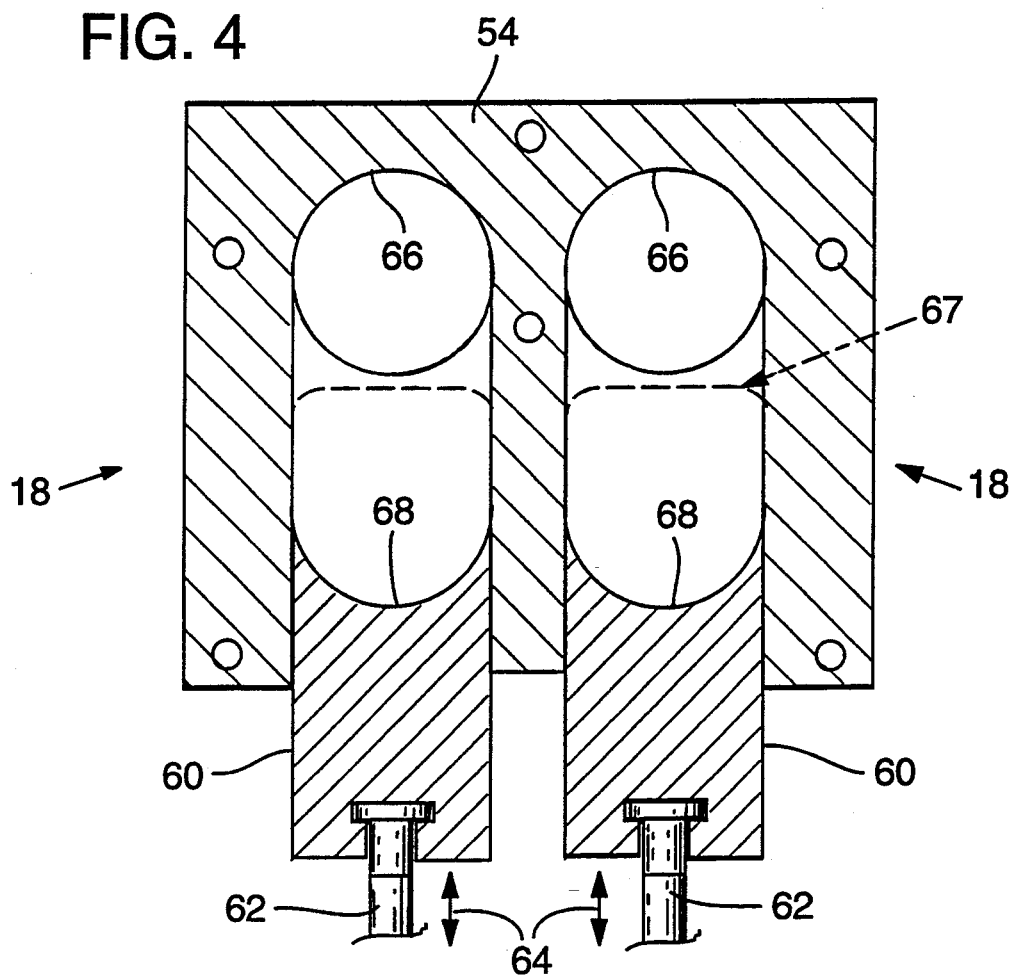
FIG. 4 is a sectional view of the forming chamber of the filling machine as viewed on view lines 4—4 of FIG. 1 showing the chamber expanded.

Refer now to FIGS. 1, 2 and 4 of the drawings. The forming chamber 18 of the machine 10 is arranged to be expanded to facilitate receiving a quantity of a food product 12 and to be contracted to form the food product 12 received in the chamber 18 into a column having a cross section mating that of a container 14 into which a sized portion of the food product 12 is to be inserted. In this embodiment, the chamber 18 when in the contracted position forms a cylinder having a cross section dimensioned to mate with a cylindrical container 14. It will be appreciated that other shapes are readily accommodated by interchanging the components of the chamber 18 to suit. The upper plunger 20, the column insert 56, the turret insert 22, the lower plunger 26 and the tamper 32 are also interchanged to correspond to the shape of the container to be filled. Other shapes (cross sections) include but are not limited to triangular, square, rectangular and the like.

Figure 3:
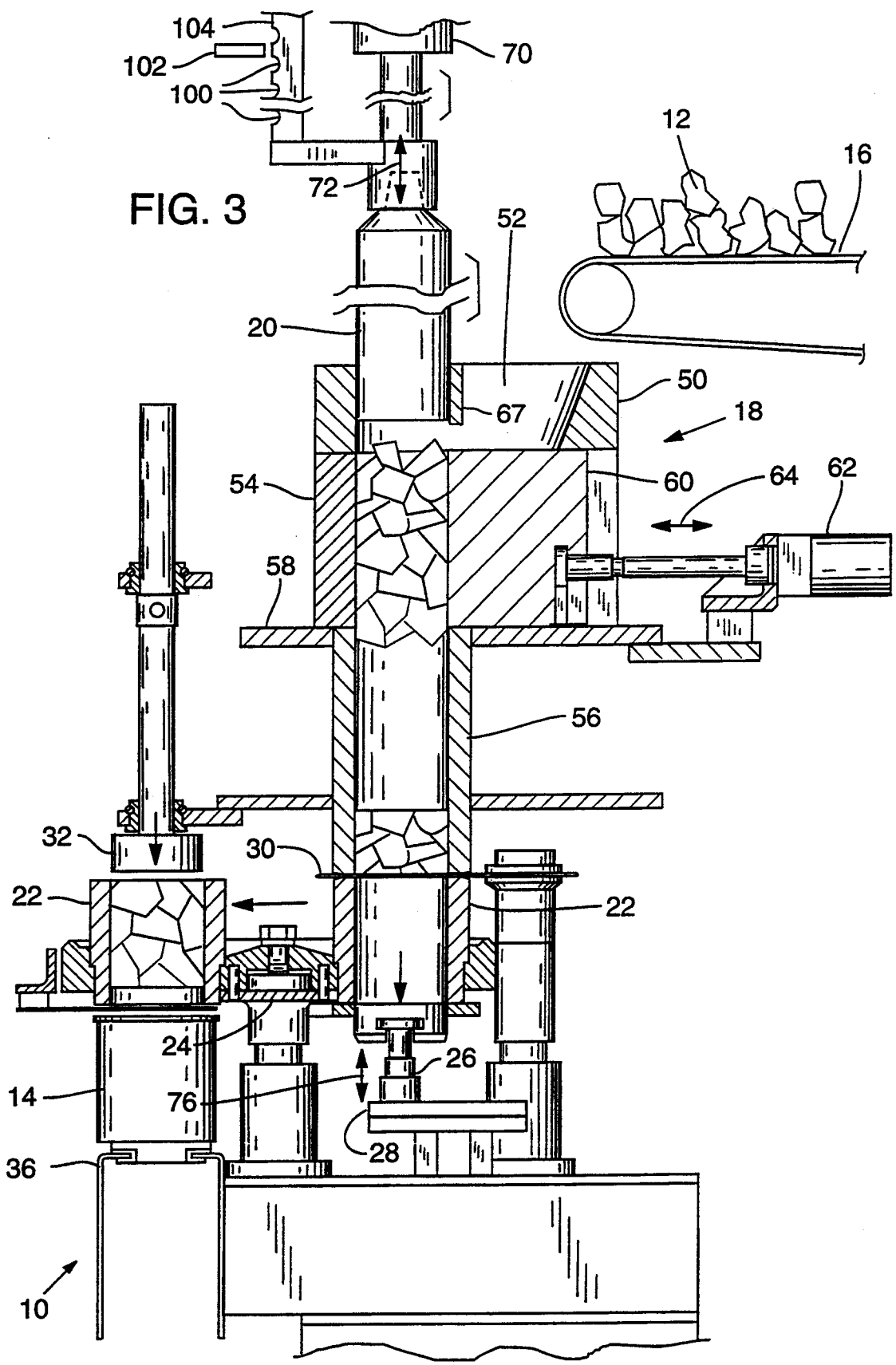
FIG. 3 is a sectional view similar to FIG. 2 showing the forming chamber in the contracted condition.
Figure 5:
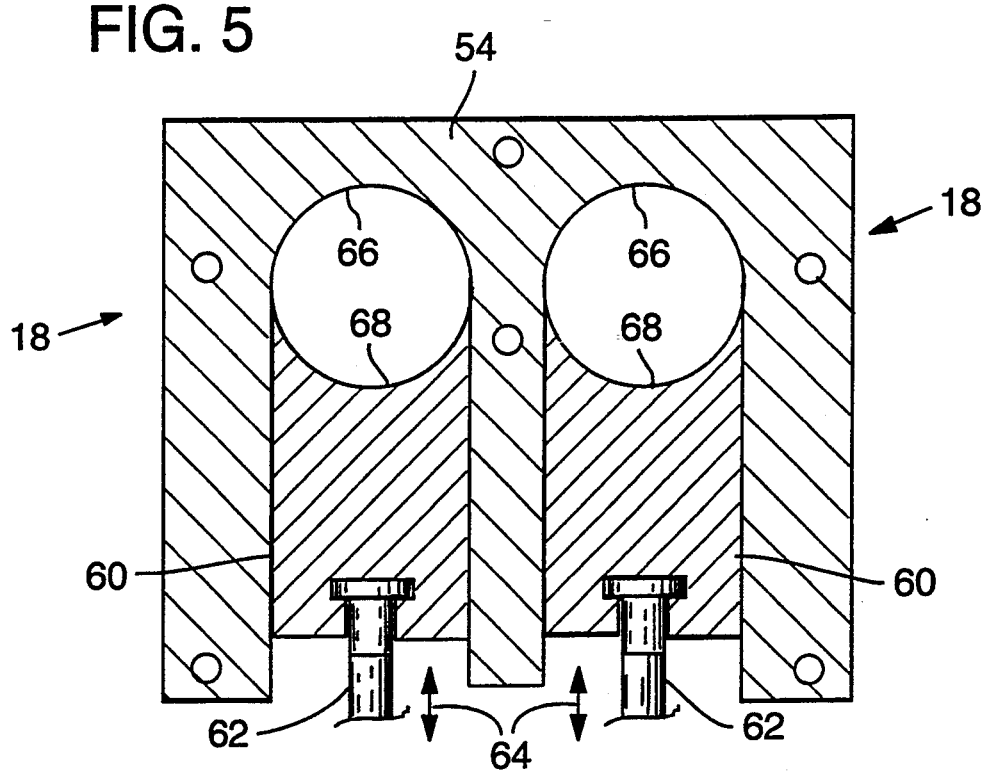
FIG. 5 is a sectional view of the forming chamber of the filling machine as viewed on view lines 5—5 of FIG. 3 showing the chamber contracted.

As seen in FIGS. 1, 2 and 4 the forming chamber 18 is in the expanded (open) position. FIGS. 1 and 2 show the chamber 18 being filled with a product 12 by the conveyor 16. The forming chamber 18 includes a funnel block 50 that has an enlarged opening 52 to facilitate feeding the product 12 from the conveyor 16 into the chamber 18. The funnel block 50 is mounted to a fixed block 54 and the block 54 is in turn mounted to a support 58 of the machine 10. As seen in FIG. 4, the block 54 is shaped somewhat like the letter E and is sometimes referred to as an E block. Slide blocks 60 are movably mounted with respect to the block 54 and are movable by cylinders 62 as indicated by the directional arrow 64. FIGS. 4 and 5 illustrate forming chambers 18 for two stations and as shown in FIG. 4, the slide blocks 60 have been retracted by the cylinders 62 to expand the forming chamber 18. The block 54 has semi-circular portions 66 and the slide blocks 60 have semi-circular portions 68. When the slide blocks 60 are moved inward as shown in FIG. 3 and 5 to contract the forming chamber 18, the portions 66, 68 cooperatively form a cylindrical column having a cross section mating that of the cross section of the container 14. Dash line 67 in FIG. 4 indicates the inner edge of funnel opening 52. As shown in FIG. 2, edge 67 only partially depends down the chamber 18 and during the filling stage, the plunger 20 provides the inner wall of chamber 18.

Referring again to FIGS. 1 and 2, the upper plunger 20 is movably mounted in the defined column formed by the funnel block 50, the block 54 and the column insert 56. It will be appreciated that the slide blocks 60 when moved inward (the plunger 20 being retracted) to contract the chamber 18 as shown in FIGS. 3 and 5, the chamber 18 becomes a part of the column definition.

The plunger 20 is movable upwardly and downwardly by a cylinder 70 (see FIG. 1) as indicated by arrow 72. The insert 22 mounted in the turret 24 becomes aligned with the column insert 56 as the turret is indexed. The lower plunger 26 is positioned strategic to the turret 24 and is movable into and out of the insert 22 to establish the height of the product formed within the insert 22 as indicated by arrow 76. A pressure switch 28 mounted strategic to the lower plunger 26 is provided to control the force of the upper plunger 20 and thus the compressive force imparted on the food product 12 being compressed in the insert 22 by the cooperative action of the upper and lower plungers 20, 26. The pressure switch 28 when it is triggered by the desired compressive force will control the advancement of the cylinder 70 by terminating the supply of the vehicle that moves the cylinder 70, such as air or oil and the like.

The filling machine 10 is operable under the control of a programmable control 40. The controller 40 is programmable to operate the machine to insert a single sized portion of a food product 12 into a container 14, to insert multiple portions of a food product into a container and to insert two different food products into the same container. The machine 10 is arranged to be operable in a single cycle mode or continuous cycle mode.

In single cycle mode, the upper plunger 20 is advanced and fully retracted each time a portion of the food product 12 is formed in the turret insert 22. This is most often utilized when the height of the product to be formed in the insert is relatively high and the food product remaining in the column insert 56 is not sufficient to produce another portion. The amount of food product 12 remaining in the column insert 56 is determined by the position of the upper plunger 20. That is, how far has the upper plunger descended into the column insert 56? Conversely, this determines how much food product is required to refill the column 56.

Attached to the upper plunger 20 is a sensor rod 104 which has formed notches 100 at spaced intervals along its longitudinal length. Sensors 102 are provided to detect the notches and thus determines the position of the plunger. The sensors 102 are connected to the controller 40 to enable the controller to control the movement of the plunger 20 and coordinate the expansion and contraction of the chamber 18 as well as control the operation of the conveyor 16. The conveyor 16 is activated by the controller 40 to deposit the correct amount of food product into chamber 18 as needed to refill the column insert 56.

In single cycle mode the slide blocks 60 are retracted to expand the chamber 18 each time the lower end of the plunger 20 enters the column insert 56. As the plunger 20 continues downward to compress the food product in the insert, the pressure switch is triggered and the position of the plunger 20 is input to the controller 40. The controller 40 then operates the conveyor 16 to replenish the expanded chamber 18 with a desired quantity of food product. The plunger 20 is retracted and the slide blocks 60 are moved in to contract the chamber 18 to form the food product 12 received in the chamber 18 into a column.

In continuous cycle, the upper plunger is retracted only when there is not sufficient food product material remaining in the column insert 56 to form another portion. The continuous cycle is most often utilized when the height of the product 12 formed in the turret insert 22 is relatively low. The position of the upper plunger 20 is sensed by the controller 40 to determine when the upper plunger requires retraction to replenish the food product 12 in the chamber 18. Operating the machine 10 in continuous cycle increases the production rate since the plunger 20 is retracted only when additional food product is required.

Figure 6:
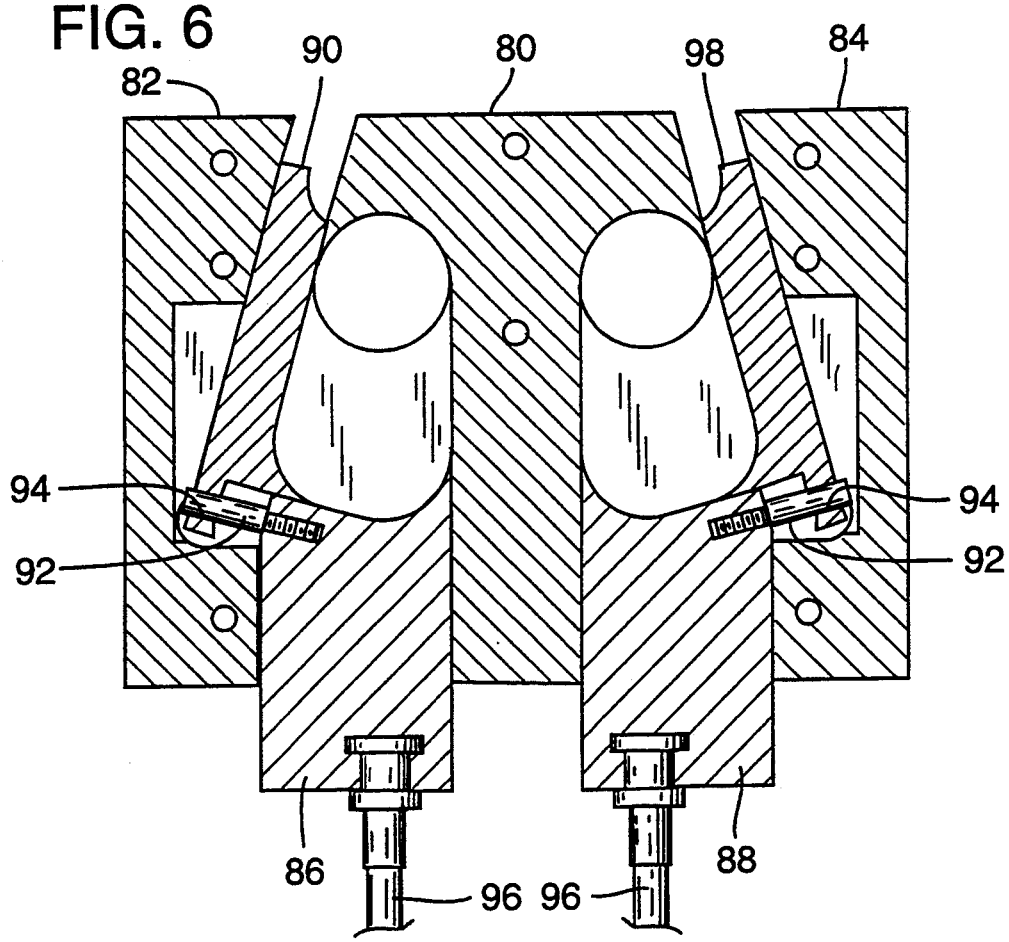
FIG. 6 is a sectional view of another embodiment of a forming chamber showing the chamber expanded; and, FIG. 7 is a sectional view showing the forming chamber of FIG. 6 contracted.
Figure 7:
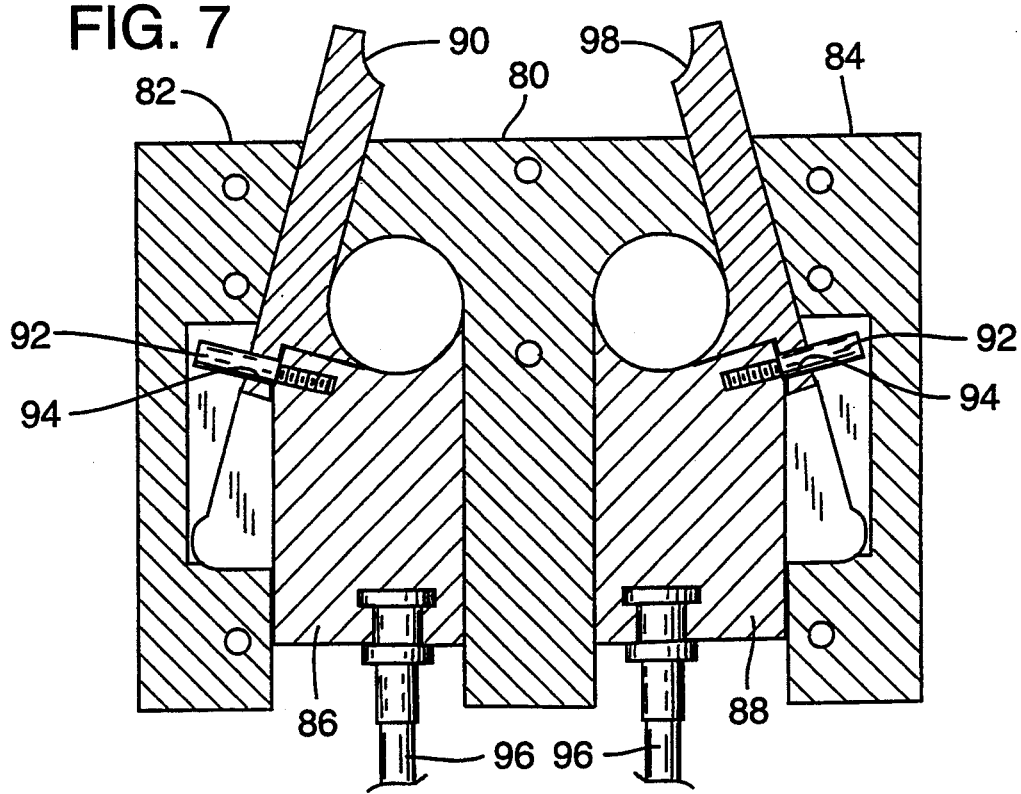

An alternate arrangement of the forming chambers 18 is illustrated in FIGS. 6 and 7. The arrangement shown in the figures is generally utilized for small sized containers and it provides for a generally large fill area for the food product 12 to enter when the chamber 18 is expanded as shown in FIG. 6. A center tee block 80 and fixed blocks 82, 84 are cooperatively mounted to receive back slide blocks 86, 88. The back slide block 86 is slidably movable between the center tee block 80 and the fixed block 82 and the back slide block 88 is slidably movable between the center tee block 80 and the fixed block 84. The back slide block 86 is connected to a side slide block 90 by a stud shaft 92. The stud shaft 92 is threadably inserted into the back slide block 86 with the shaft portion of the stud shaft 92 being slidably received in a bore 94 in the side slide block 90. The side slide block 90 is slidably movable between the fixed block 82 and the center tee block 80. The back slide block 86 is movable by a cylinder 96. The back slide block 88 is similarly connected to another side slide block 98 by another stud shaft 92. The back slide block 88 is slidably movable between the fixed block 84 and the center tee block 80 by another cylinder 96. FIG. 6 illustrates the chamber 18 in the expanded condition and FIG. 7 illustrates the chamber 18 in the contracted condition. The center tee block 80, the back slide blocks 86, 88 and the side slide blocks 90, 98 cooperatively form a column of cylindrical cross section when the back slide blocks 86, 88 are advanced as shown in FIG. 7. It will be appreciated that operation of this alternate embodiment is similar to that of FIG. 1 which will not be here repeated.

Those skilled in the art will recognize that other variations and modifications may be made without departing from the true spirit and scope of the invention. The invention is therefore not to be limited to the embodiments described and illustrated but is to be determined from the appended claims.

What is claimed is:

1. In combination with an automatic machine for inserting a sized portion of a food product into a container, a food product forming and sizing apparatus comprising:

a chamber mounted on the machine, said chamber being expandable and contractible, said chamber when expanded defining an enlarged opening to facilitate receiving a food product to be sized, said chamber when contracted defining a column to facilitate forming the food product received in said chamber into a column;

a mechanism for expanding and contracting said chamber;

a plunger, said plunger movably mounted for movement into and out of the defined column of said chamber;

a food product fill mechanism and a control cooperatively operating said food product fill mechanism, said plunger and said mechanism for expanding and contracting said chamber to fill the chamber with the chamber expanded and the plunger inserted in the column of said chamber, and to contract said food product into said column with the plunger retracted out of said column of said chamber;

a portion sizing apparatus alignable with said column of said chamber and said plunger;

whereby a food product is received in said expanded chamber in position to be contracted into said column as a previously contracted portion of food product is sized into a portion by the plunger forcing and compressing the food product in said column into said portion sizing apparatus.

2. A container filling apparatus that receives food product and inserts the food product into containers, comprising:

an expandable chamber having an expanded condition and a contracted condition forming a column;

a conveyor for depositing food product into the chamber with the chamber in said expanded condition, a mechanism for expanding and contracting said chamber between said expanded food product receiving condition and said contracted column-forming condition, said chamber being contracted with the food product contained therein to conform the chamber and product therein to the size of the container to be filled, said chamber having an open top and an open bottom;

a receptacle positioned under said contracted chamber for receiving a determined portion of the food product;

a plunger mounted above said contracted chamber having vertical reciprocal movement, a bottom portion of said plunger sized to fit the chamber when contracted and for moving the food product therein into the receptacle; and a control mechanism controlling and coordinating movement of the conveyor, the plunger, and the mechanism for expanding and contracting the chamber whereby a desired quantity of food product is deposited by the conveyor in the expanded chamber as the plunger moves a prior quantity of food product from the chamber into the receptacle, and whereby the food product deposited in the chamber is contracted following movement of the plunger out of the chamber.

3. A container filling apparatus as defined in claim 2 wherein said plunger is an Upper plunger, the reciprocation of the upper plunger defining a stroke length, said stroke length being variable, a lower plunger in said receptacle against which the food product is compressed by said plunger, a detector connected to said lower plunger for detecting the compressive pressure applied to compress the food product into the receptacle resulting from the upper plunger pushing the food product through the chamber and against said lower plunger in the receptacle, said detector detecting the desired compressive pressure indicating the presence of a determined portion of the food product deposited in the receptacle, said upper plunger responsive to the detector to stop the upper plunger when the receptacle has received said determined portion.

4. A container filling apparatus as defined in claim 3 including a second detector on said upper plunger for detecting the length of stroke of the upper plunger when the filled receptacle is detected, said second detector indicating the unfilled chamber volume, said conveyor responsive to said second detector for conveying to said chamber a quantity of food product determined for filling the unfilled chamber volume.

5. A container filling apparatus as defined in claim 4 wherein the receptacle is a portion sizing apparatus including:

an insert having an opening therein configured and sized to the size of the container to be filled, and a blade for severing the food product at the desired height in the insert, and a transfer mechanism for transferring the filled insert to a container filling station for transfer of the food product from the insert to a container.

* * * * *